Aug. 22, 1933.  E. SCOFIELD  1,923,753
ARTICLE DISTRIBUTING DEVICE
Filed June 8, 1926  4 Sheets-Sheet 2

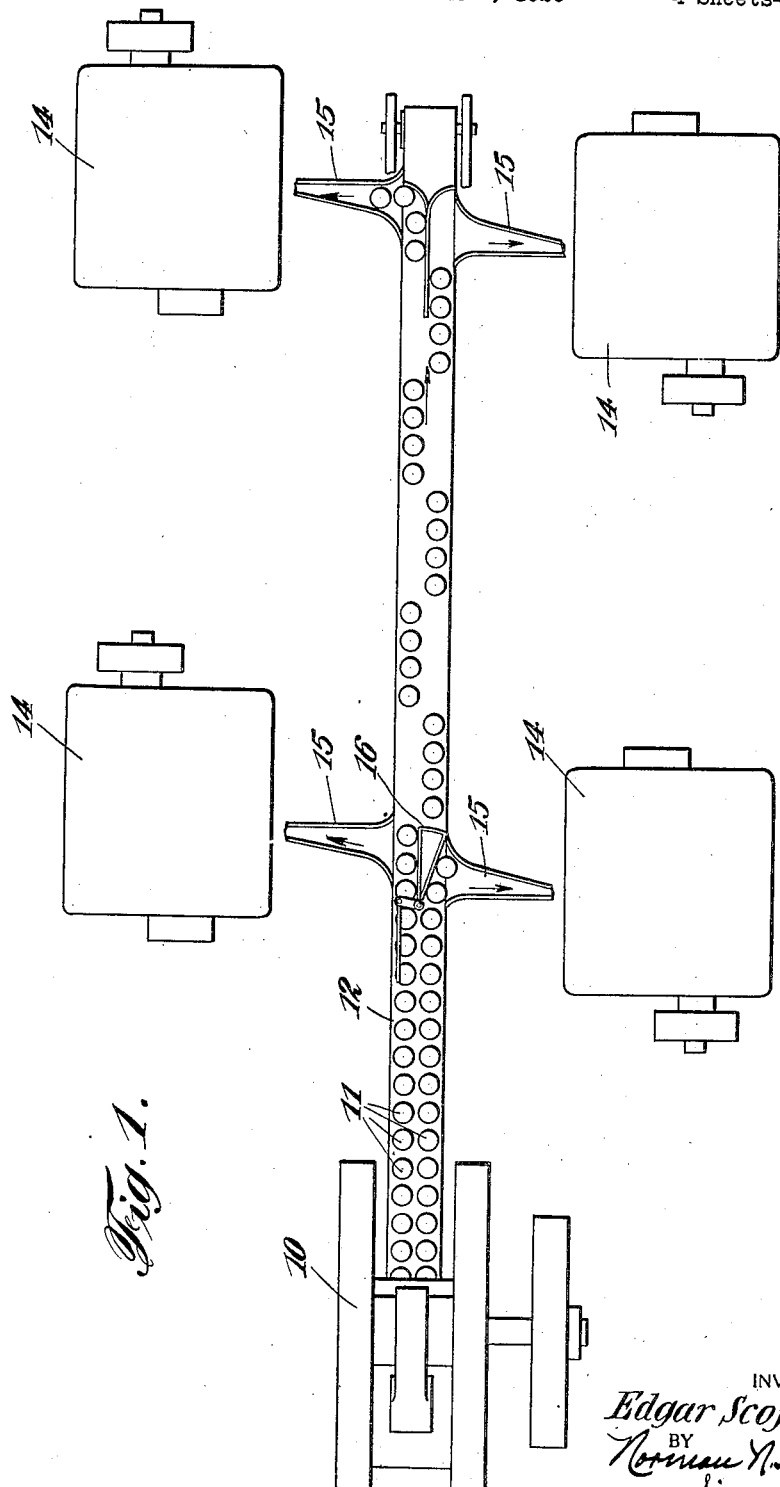

INVENTOR
Edgar Scofield
BY Norman N. Holt
his ATTORNEY

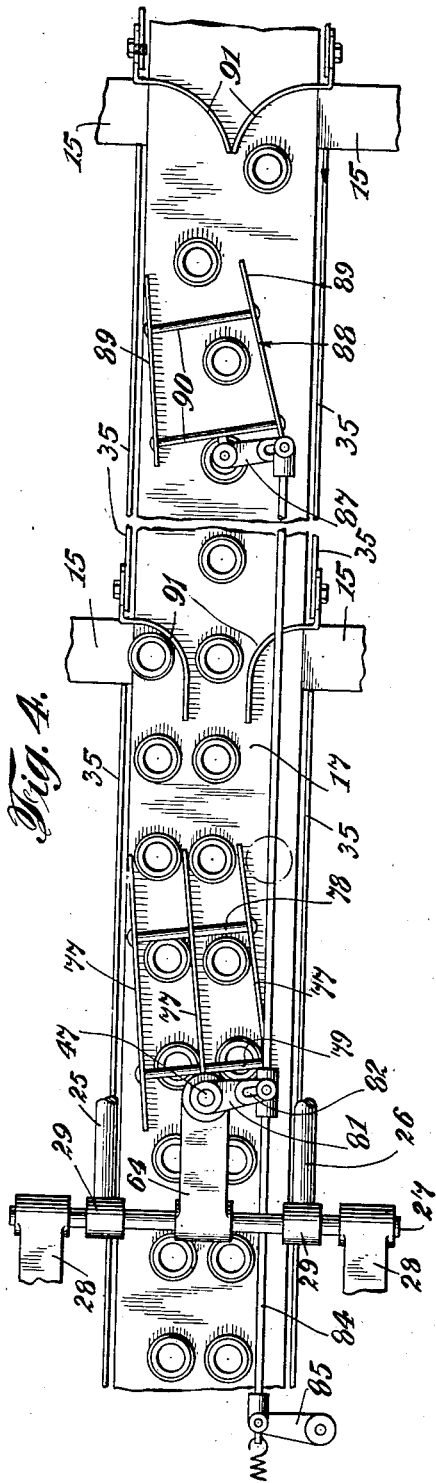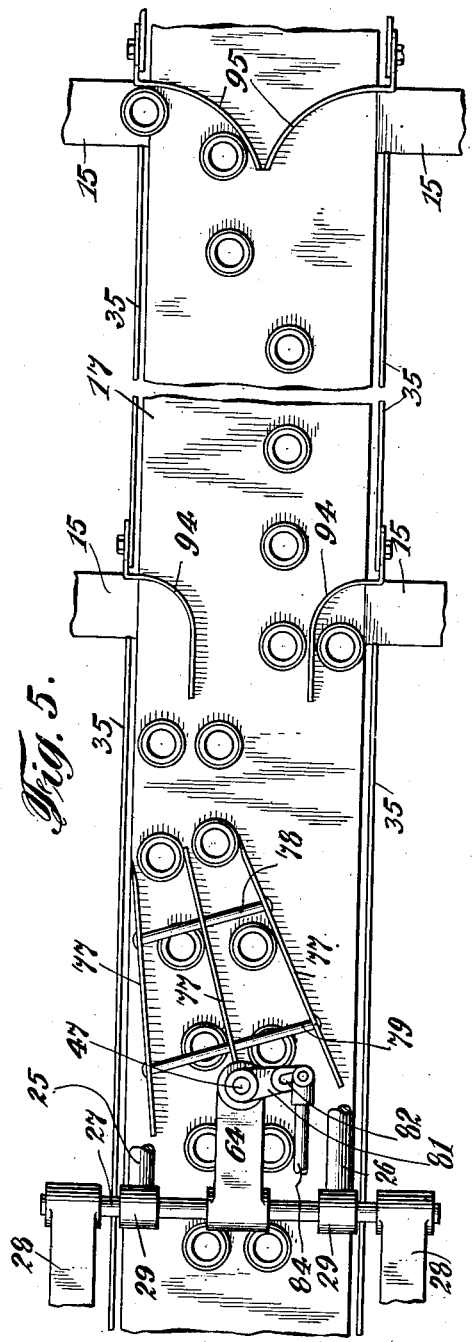

Aug. 22, 1933.　　　　E. SCOFIELD　　　　1,923,753
ARTICLE DISTRIBUTING DEVICE
Filed June 8, 1926　　4 Sheets-Sheet 4
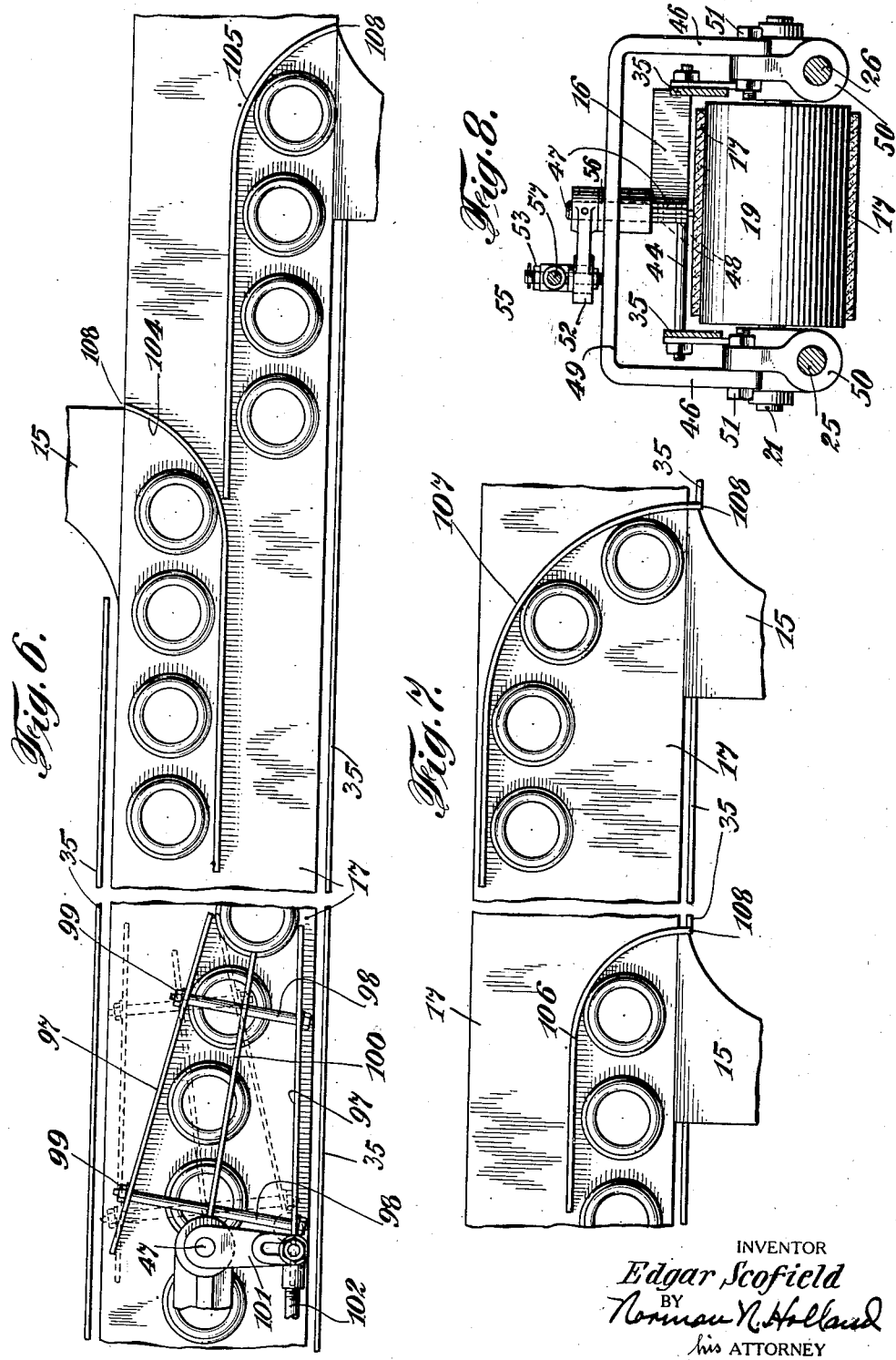
INVENTOR
Edgar Scofield
BY
Norman N. Holland
his ATTORNEY Patented Aug. 22, 1933

1,923,753

UNITED STATES PATENT OFFICE 1,923,753

ARTICLE DISTRIBUTING DEVICE

Edgar Scofield, New York, N. Y., assignor to Anchor Cap and Closure Corporation, Long Island City, N. Y., a Corporation of New York Application June 8, 1926. Serial No. 114,518

17 Claims. (Cl. 198—31)

The present invention relates to distributing devices and more particularly to a device for distributing articles to a plurality of machines.

In the manufacture of various articles, it is frequently necessary to have different steps in the manufacture performed by separate machines. For instance, in the manufacture of closure caps it is customary to stamp the blanks from strips of sheet metal into dish-shaped forms and thereafter run the blanks through threading, beading, or other finishing machines to complete the articles. In many instances, one of the machines may operate at a much lower or higher rate than the other in which event it is necessary that both machines be operated at substantially the same rate if they are to be interconnected or else utilize some means for distributing the articles received from the faster machine to a number of slower ones.

Devices of this general character now in use are objectionable because of their complicated mechanisms, their ineffective operation and because of their inability to effectively distribute the articles so that one machine will not receive more than another. It will be understood that feeding the articles too rapidly will clog the operating mechanisms, causing interruptions and requiring the attention of an attendant continuously. The present invention overcomes these difficulties by providing an inexpensive and effective means of distributing articles, which is very simple in construction and in operation, to receive the articles from one machine and distribute them in different paths to other machines.

Generally speaking, these advantages are attained by utilizing one or more deflecting means, through which the articles pass in one or more lines or paths and are deflected transversely of a conveyor into a greater number of paths leading to the finishing machines. Preferably the deflector is oscillated at such a rate that a number of articles are delivered to each path alternately rather than a single article upon each oscillation of the deflector. A plurality of deflectors may be utilized, one to divert the articles on the conveyor into a series of paths and the others further to increase the number of paths to any desired extent. The invention further contemplates the changing of two rows of articles on a conveyor to three or more rows so that they may be suitably distributed to the finishing machines.

An object of the invention is to provide an effective distributing device which will receive articles or blanks on a conveyor and distribute them to a plurality of machines uniformly and in equal numbers to each machine.

Another object of the invention is to provide a distributing device effective upon a plurality of rows of articles on a conveyor to increase the number of said rows whereby a plurality of machines may be fed without increasing the speed of the articles on the conveyor.

A still further object of the invention is to provide a distributing device having a deflector adapted to be effective upon a pair of rows of articles to divert said pair of rows into three rows, the center row having twice as many articles as its adjacent rows, and utilizing a second deflector to divert said center row of articles into two rows whereby articles may be fed to four machines on a conveyor having a width sufficient to accommodate three rows of said articles.

A still further object of the invention is to provide a distributing device for receiving articles from a stamping machine adapted to form a plurality of articles simultaneously, and distributing said articles to a plurality of machines effectively and efficiently, delivering an equal number of articles to each machine.

Other and further objects of the invention will be obvious upon an understanding of the illustrative embodiment about to be described, or will be obvious from the accompanying drawings, or indicated in the appended claims; and various advantages secured by the invention other than those herein specifically referred to, will occur to one skilled in the art upon employment of the invention in practice.

A preferred embodiment of the invention has been chosen for purposes of illustration and description and is shown in the accompanying drawings, wherein Fig. 1 is a diagrammatic illustration of one form of distributing device applied to a conveyor receiving two lines of blanks from a stamping machine for distributing the blanks to four finishing machines;

Fig. 2 is a detailed top-plan view of portions of the device shown in Fig. 1;

Fig. 3 is a sectional view of the parts shown in Fig. 2, taken along the line 3—3 thereof;

Fig. 4 is a top-plan view of another form of device adapted to distribute two lines of blanks on a conveyor to four machines;

Fig. 5 is a top-plan view of another form of the invention;

Fig. 6 is a detailed view showing a distributing device delivering blanks to two machines on opposite sides of the conveyor;

Fig. 7 is a detailed view showing the device in Fig. 6 distributing blanks to a pair of machines on the same side of the conveyor; and Fig. 8 is a sectional view along the line 8—8 of Fig. 2.

Referring to the drawings, there is shown in Fig. 1 a diagrammatic layout in which a machine 10 delivers articles or blanks 11 to a conveyor 12. The machine may stamp two or more articles simultaneously and deliver them to the conveyor in a number of rows at a rate considerably greater than the capacity of a single finishing machine. In the present case the machine chosen is adapted to feed four finishing machines 14, by means of suitable chutes 15 leading from the conveyor to the individual machines. Preferably the chutes are positioned substantially opposite each other so that between the first pair a deflector 16 may be mounted to be oscillated transversely of the conveyor to deflect the blanks of one row into a chute and to permit the blanks in the other row to continue along the same line of movement to the diagonally opposite chute and machine. The oscillations of the deflector may be so timed that a series of four blanks are deflected and allowed to pass in each instance. The chutes are adapted to accommodate several blanks at a time and by utilizing enough finishing machines so that the blanks will be fed thereto at a rate slightly less than their normal capacity, the stamping machine may be run at full speed without the attention of an operator. Further, if there is a slight discrepancy in the proportion of blanks fed to the machines, the extra supply will be taken care of without difficulty. In the manufacture of closure caps, two finishing machines usually absorb the output of a single die stamping machine and four machines the output of a double die stamping machine.

Any suitable type of conveyor, such as that formed by the belt 17 on pulleys 18 and 19, may be utilized. The pulleys may be mounted upon shafts 20 and 21 in bearings 22 suitably fixed to the supporting rods 25 and 26, which may be supported at one end by means of a bar 27 mounted in extensions 28 on the framework of the machine and having suitable seats 29 for the ends of the supporting rods 25 and 26. The other ends of the rods may be mounted on the vertical supports 31. Additional supports, if needed, may be provided intermediate the two points of support shown and described herein. The bearings 22 for the pulley 19 are preferably held in position by nuts 34 which may be moved longitudinally of the rods 25 and 26 to adjust the tension of the belt as desired. Guide rails 35 are provided at the edges of the conveyor belt to prevent the blanks from being deranged in any instance and are mounted upon the rods 25 and 26 by supporting standards 37 provided thereon at suitable intervals. The standards are slotted as shown at 38 to facilitate an adjustable attachment by means of bolts 39 to the extensions 40 riveted to the guide rails 35. The chutes 15 may be of any desired form but are here shown having a vertical side 41 with a lateral flange 42 which slopes or curves downwardly to meet the vertical side in a narrow groove 43 so that the blanks when deflected onto the flange will be turned edgewise as they advance sufficiently far thereon. The guide rails may in addition to their other functions serve as supports for small rods 44, mounted thereon by means of suitable nuts to serve as holding means for the guides 45 leading to the chutes 15 for the machines farthest from the stamping machine.

The deflector 16 is mounted between the chutes leading to the first pair of finishing machines and comprises a narrow strip of metal bent into a triangular form with its free ends joined and attached to a suitable pin 47 by means of the bolts 48 extending through the bifurcated end of the pin. Such a deflector furnishes a straight guide for one row of blanks when deflected to one side of the conveyor and diverts the other row of blanks into one of its adjacent chutes. Its operations may be so timed that a predetermined number of blanks here shown as four, may be fed to the respective machines upon each oscillation thereof. The position of these blanks at various times is illustrated in Fig. 1. A suitable support for the deflector over the center of the conveyor may be formed by inverting a U-shaped member 49 and attaching its free ends 46 to the members 50 on the rods 25 and 26 by means of the bolts 51. A suitable aperture is formed at the center of the bar portion of the member 49 to accommodate the pin 47 attached to the deflector.

An arm 52 is rigidly mounted on the upper end of the pin 47 and slotted at its extremity to receive the bolt 55 upon which the member 54 is rotatably mounted. The bolt 55 may be suitably positioned in the slot by means of the nut 53 to change the effective length of the arm 52 and to control the angle through which the deflector oscillates. A suitable washer 56 may be mounted between the member 49 and the arm 52 about the pin 47 to prevent wear and to provide clearance for movement of the arm. A rod 57 having bifurcated members at its respective ends is adapted to be pivotally attached to the member 54 at one end and to a similar member 58 at its other end, which is adjustably secured by means of a bolt 59 to a slot 60 in the oscillating lever 61 pivoted at its center portion to the member 64, suitably mounted on the rod 27. The other end of the lever 61 has a rod 65 pivotally and adjustably secured in a slot 66 with its other end attached to an arm 63 mounted on the shaft 68 extending through bearing 73 and having another arm 69 at the lower end thereof with a cam roller 70 thereon in engagement with the cam 71 which is mounted on shaft 72 of the main stamping machine. A spring 75 is anchored to the framework of the machine at 76 and to a pin 77 at the end of the rod 65 to hold the cam roller 70 in engagement with the cam at all times. As the shaft 72 rotates, the deflector 16 is oscillated through the arms 63 and 69, shaft 68, rod 65, pivoted lever 61, rod 57, and member 52, to deflect blanks in one row into one of the adjacent chutes and simultaneously to permit the blanks in the other row to pass along the conveyor to one of the curved guides 45 leading to the chutes for the second pair of finishing machines. In this manner the deflector directs blanks simultaneously to diagonally opposite pairs of machines alternately to distribute the blank equally to the four machines.

A slightly different form of deflector is shown in Figs. 4, 5 and 6 of the drawings wherein three strips of metal 77 are held in position by a pair of pins 78 and 79, one of the pins being shorter than the other so that the strips at one end will be separated sufficiently to pass a blank between each pair, while at their other ends they will be substantially further separated to facilitate the entry of the blanks. The pin 47 described hereinbefore with reference to Fig. 2, may be secured to the middle strip 77 for oscillating the deflector. An arm 81 is secured to the upper end of the pin 47 and has a slot 82 in its free end to which the rod 84 is adjustably secured. One end of the rod 84 is attached to the arm 85, operatively connected to a suitable cam as described hereinbefore, and its other end is adjustably attached to an arm 87 operatively connected to the deflector 88, which is formed by two strips of metal 89 held in position by pins 90 riveted thereto and adapted to accommodate a single row of blanks.

The two rows of blanks are delivered to the conveyor by any suitable machine, one row passing through one side of the deflector and the other row through the other side thereof. The cam operating the deflector is so shaped that it oscillates the deflector alternately from one side of the conveyor to the other permitting it to remain in its extreme position on each side of the conveyor sufficiently long for four blanks to pass through each side thereof. The width of the belt 17 is such that it will accommodate three rows of blanks adjacent each other, and the deflector when it moves to one side, diverts the two rows of blanks as near that side as possible making one of them adjacent the edge of the belt which continues in this position until it reaches the curved guides 91 leading into one of the chutes 15. The other row of blanks diverted to the center of the belt, is a continuous row, since if one side of the deflector is not delivering caps thereto the other is, and the blanks in this row are passed straight along the center of the conveyor until they reach the deflector 88 which operates simultaneously with the other deflector to divert four blanks into one of the adjacent chutes 15 and then four into the other, alternately. The curved guides 91 receive the blanks as they are delivered from the deflector. In this manner a belt which is sufficiently wide to accommodate three rows of caps may be readily utilized for feeding four machines.

In the embodiment of the invention shown in Fig. 5, the belt 17 is sufficiently wide to accommodate four rows of caps. The curved guides 94 extend substantially one-quarter of the way across the respective edges of the belt to direct the outside rows of caps into the chutes leading to the first pair of operating machines. Further along the conveyor a second pair of curved guides 95 is provided adjacent the second pair of finishing machines with their inner ends joined at substantially the center portion of the belt so that the two rows of blanks which pass between the guides 94 are diverted by the second pair of guides 95 into the chutes leading to the second pair of finishing machines. The operation of the deflector is similar to the operation of the first deflector described in Fig. 4, but the belt being wider instead of forming three rows of blanks when oscillated from one side to the other of the conveyor, forms four rows and the location and position of the guides 94 and 95 eliminate the necessity for the second deflector shown in Fig. 4.

With single die types of stamping machines it is only necessary to use a pair of finishing machines and the blanks are delivered to the conveyor in a single row. Embodiments of the invention particularly applicable to this type of machine are shown in Figs. 6 and 7 wherein an apparatus is provided to deflect the blanks to two machines whether positioned on the same side of the conveyor or on opposite sides thereof. The deflector is somewhat similar to that shown and described hereinbefore in that a pair of strips of metal 97 are held in position at their respective ends by the bolts 98 and nuts 99. The pin 47 is secured to a central strip 100 attached to the central portions of the bolts 98 and an upper arm 101 is attached to the pin, as described hereinbefore, and secured to a rod 102, operatively connected to a cam driven by the main operating machine. The single row of blanks delivered to the conveyor is diverted alternately from one side to the other and a number, here shown as four, permitted to pass during each oscillation of the deflector. These blanks continue along the conveyor at the respective sides thereof until they engage the curved guide 104 or 105, which diverts the blanks into the chutes leading to the machines on the respective sides of the conveyor. In Fig. 7 guide 106 extends to the center of the conveyor while guide 107 extends substantially across the conveyor, whereby two machines on the same side of the conveyor may be readily fed by the deflector shown in Fig. 6. Preferably the curved guides are so shaped and positioned that the blanks follow their contour and revolve about their ends 108 as a pivot in moving from the conveyor into the chutes, thereby preventing any tendency of the caps to become inverted or to enter the chutes improperly. The operation of the various deflectors may be adjusted by positioning the operating rods in the slots through which they are connected to the deflectors.

It will be seen that a very effective apparatus has been provided for distributing articles to a number of machines, whereby articles may be delivered directly from one machine to a series of machines instead of being stored and fed independently to the machines operating more slowly. The attendance of an operator is completely eliminated by having the operating capacity of the slower machines collectively greater than the operating capacity of the fast machine. Further, the apparatus is simple in construction and may be readily manufactured from commercial parts and is fully capable of withstanding the rough usage to which it may be subjected.

As various changes may be made in the above embodiment without departing from the spirit of the invention, it is to be understood that all matter herein set forth is to be taken as illustrative and not in a limiting sense.

Having thus described my invention, I claim:

1. In a device of the class described, the combination of a single conveyor adapted to carry a pair of rows of articles, means adapted to be oscillated transversely of said conveyor and devices to direct said pair of rows into three paths for distribution to various machines and devices operatively connected to a source of power for operating said means independently of said articles.

2. In a device of the class described, the combination of a machine adapted to deliver a plurality of blanks simultaneously, a conveyor for receiving said blanks in a plurality of rows thereon, a deflector operatively connected to said machine and effective upon said rows of blanks to deflect blanks from each of said rows to substantially the center of said conveyor, and a second deflector effective upon certain of said blanks to deflect them into a plurality of additional paths.

3. In a device of the class described, the combination of a conveyor for receiving blanks in a pair of rows thereon, and a deflector for changing said pair of rows into three rows of blanks.

4. In a device of the class described, the combination of a conveyor for receiving said blanks in a pair of rows thereon, a deflector for changing said pair of rows into three rows, and a second deflector for changing one of said three rows of blanks into two additional rows for the proper distribution to operating machines.

5. In a device of the class described, the combination of a conveyor for receiving blanks in a pair of rows, a deflector effective upon said pair of rows to distribute said blanks into three paths with the path in the center having substantially twice as many blanks therein as the adjacent paths.

6. In a device of the class described, the combination of a conveyor for receiving blanks in a pair of rows, a deflector effective upon said pair of rows to distribute said blanks into three paths with the path in the center having substantially twice as many blanks therein as the adjacent paths, and a second deflector effective upon said center path to change it into two additional paths, whereby a conveyor having a width sufficient to accommodate three rows of blanks adjacent each other may be utilized to supply the blanks to four machines.

7. In a device of the class described, the combination of a conveyor for receiving blanks in a pair of rows, and a deflector effective upon each of said rows to alternately deflect the blanks therein into a center row, whereby a continuous row of blanks is formed at the center of the conveyor and interrupted rows of blanks are formed on each side of the conveyor.

8. In a device of the class described, the combination of a conveyor for receiving blanks in a pair of rows, a deflector effective upon each of said rows to alternately deflect the blanks therein into a center row, whereby a continuous row of blanks is formed at the center of the conveyor and interrupted rows of blanks are formed on each side of the conveyor, and a second deflector adapted to deflect said center row of blanks into two paths to feed a pair of machines.

9. In a device of the class described, the combination of a conveyor for receiving blanks in a pair of rows, a deflector effective upon each of said rows and adapted to be oscillated to form three rows of blanks, means for directing the outside rows of blanks to operating machines, and a deflector for deflecting said center row of blanks to a plurality of machines.

10. In a device of the class described, the combination of a conveyor adapted to receive blanks in a pair of rows, an oscillating means for diverting temporarily one of said rows of blanks to an operating machine, means permitting the other row of said blanks temporarily to continue along the conveyor.

11. In a device of the class described, the combination of a conveyor adapted to receive blanks in a pair of rows, means for diverting each of said rows of blanks alternately to an operating machine, said means permitting the other row of said blanks to continue along the conveyor, whereby the blanks may be distributed to a plurality of machines.

12. In a device of the class described, the combination of a conveyor adapted to carry a plurality of rows of blanks, a deflector effective upon two of said rows of blanks alternately to deflect each of said rows to its respective side of the conveyor so that it may be conducted to a suitable operating machine and permitting the other row of blanks to continue along the conveyor to distribute said rows of blanks to suitable machines.

13. In a device of the class described, the combination of a conveyor adapted to receive blanks, means to guide them into a plurality of paths, a plurality of chutes leading to machines and means extending across said paths to guide said blanks into the chutes leading to the machines, said last named means being arcuate in shape with a protruding end to prevent inversion of said blanks upon removal from the conveyor to the chutes.

14. In a device of the class described, the combination of a conveyor adapted to receive blanks, means operatively connected to guide them into a plurality of paths, and means extending across said paths to guide said blanks into chutes, said last named means being arcuate in shape having its end formed into a pivot about which said blanks move as they leave the conveyor, whereby they are prevented from being inverted.

15. In a device of the class described, the combination of a conveyor for blanks, a deflector comprising three strips forming two passageways for blanks therebetween, means engaging the central strip for suspending said deflector over said conveyor, and devices for oscillating said deflector to distribute the two rows of blanks passing through said passageways to a plurality of machines.

16. In a device of the class described, the combination of a machine adapted to deliver a plurality of rows of blanks, a conveyor for receiving said blanks in a plurality of rows thereon, a deflector operatively connected to said delivery machine effective upon said rows of blanks on said conveyor to deflect the blanks in said rows into a plurality of paths to distribute them to suitable machines, said deflector being adapted to deliver more articles to one row than to another, and a second deflector effective upon the row of articles having the greatest number of articles therein.

17. In a device of the class described, the combination of a machine adapted to deliver a plurality of blanks simultaneously, a single conveyor for receiving said blanks in a plurality of rows thereon, and a deflector operatively connected to said delivery machine effective upon said rows of blanks to deflect the blanks on said conveyor into a plurality of paths to distribute them to suitable machines, the operation of said deflector being independent of said articles and said deflector being adapted to deliver more articles to one row than to another.

EDGAR SCOFIELD.